Patented Feb. 2, 1954

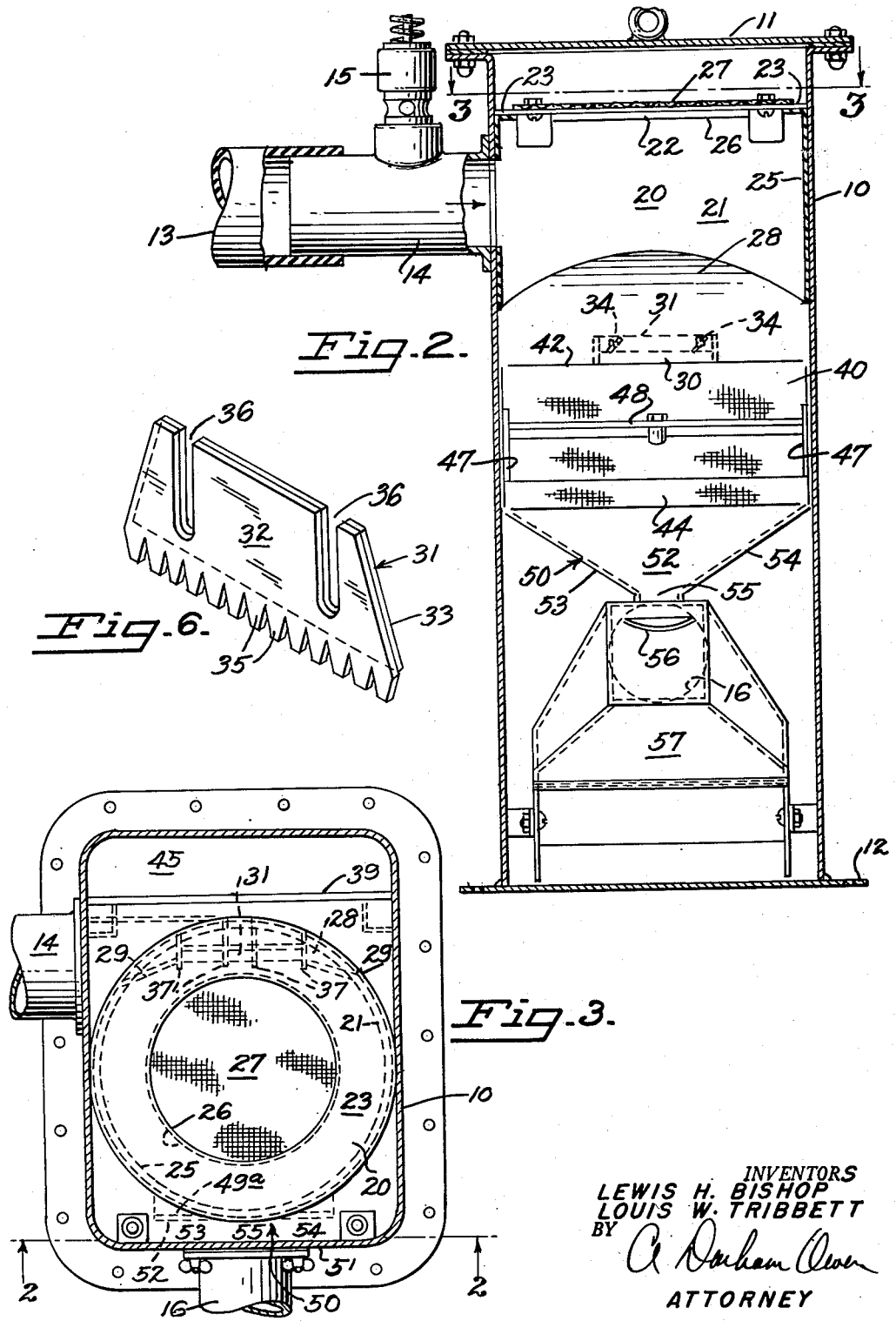

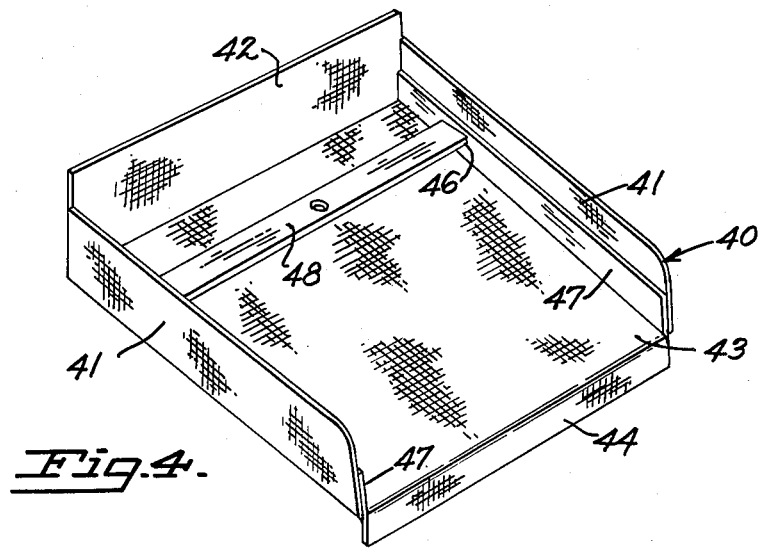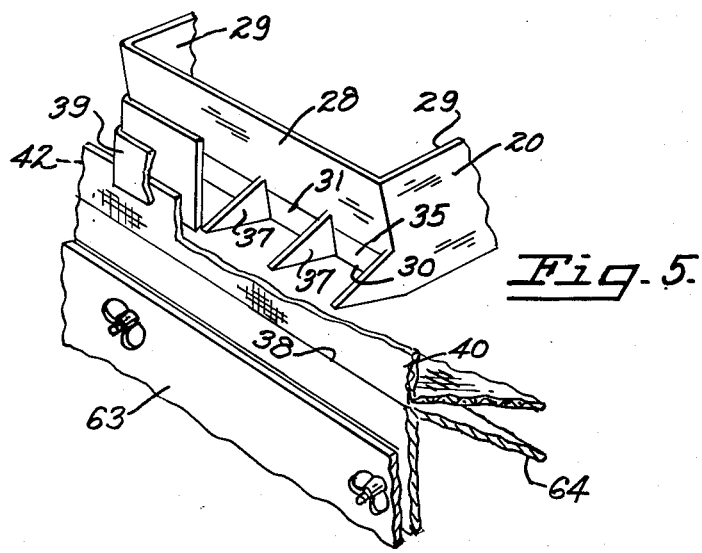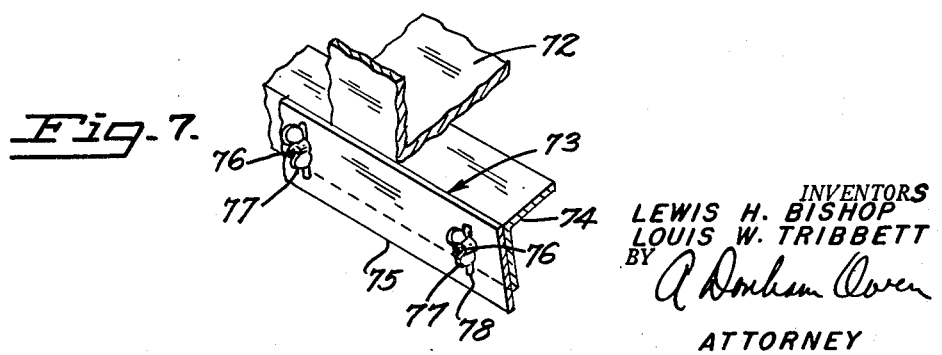

2,667,969

UNITED STATES PATENT OFFICE 2,667,969

AIR SEPARATOR FOR RECLAIMING ABRASIVES FROM WASTE MATERIALS

Lewis H. Bishop, Burlingame, and Louis W. Tribbett, Santa Monica, Calif., assignors, by mesne assignments, to William H. Mead, Oakland, Calif.

Application October 26, 1950, Serial No. 192,256

20 Claims. (Cl. 209—34)

This invention relates to apparatus for separating from each other two or more commingled granular or comminuted materials.

The present invention is an improvement over the apparatus disclosed in the co-pending application filed on October 7, 1947, by William H. Mead, Lewis H. Bishop and John S. Finn, Serial No. 778,378, now Patent No. 2,635,745. Like that apparatus, the present invention is particularly useful in connection with a surface treating apparatus where the treating material is impelled against a surface and the expended material and the waste are simultaneously removed from the surface by suction. Such an apparatus is described in the William H. Mead Patent Re. 23,186, original issued December 7, 1949, and reissued January 3, 1950. The present invention may be used with that apparatus to separate the spent abrasive from the worthless refuse or dust with which it has become mixed, and to reclaim the abrasive for immedate re-use, but it is not limited to such use.

Heretofore the presence of many large pieces of waste in the recovered materials has caused problems. For example, when large flakes of paint were peeled off a surface being treated and were sucked up and carried into the reclaimer along with the abrasive and the waste duct, the large pieces interfered with the operation of the reclaimer. The large flakes were too large to be separated from the abrasive by air in the same manner that the dust could be separated. Heretofore, attempts were made to separate them by screens, but when screens were used, the flakes accumulated so fast they soon covered the screen and prevented the passage of abrasive and other fine particles. The whole separating operation then had to be shut down until the waste flakes were manually removed from the screen. Sometimes this has meant that the apparatus could operate for less than a minute at a time.

A similar problem has occurred when concrete has been treated with an abrasive. The loosened gravel and rocks that have been sucked up into the reclaimer have accumulated so fast that the operation has had to stop every minute or so for removal of the rocks and gravel.

In the reclaimer of the present invention, paint flakes, rocks, and other large waste materials are continuously separated from the rest of the mixture and are conveyed directly into the waste outlet duct. From there they are carried away continuously by the same airstream which has in the meantime separated the finer particles of waste from the abrasive and is carrying them away. All the waste is carried by the airstream to disposal units where they are easily handled. With this new device the treating operation never has to stop in order to remove accumulated waste.

Another problem caused by the presence of large waste particles in the recovered materials was the interference they caused in separating the abrasive from the fine waste. The large particles caused turbulence in the airstream and made its velocity subject to sudden changes. This turbulence and unevenness made it impossible to maintain the fine balance necessary for accurate separation of the abrasive from the fine waste. As a result, either some of the abrasive was lost with the waste and the store of abrasive became depleted, or some of the waste remained mixed in with the abrasive, reducing its effectiveness. Residual dust not only lowers the efficiency of the abrasive, but it has even caused complete stoppage of the apparatus by its adverse effect on the self-balancing grit feed valve described in the William H. Mead Patent No. 2,521,931, granted September 12, 1950.

In the apparatus of the present invention all the large size waste material is removed from the recovered materials before the abrasive is separated from the small waste, so that there are no large particles in the mixture at the time the fine particles are separated. Thus the accuracy of separation of the fine waste from the abrasive is not interfered with.

The present invention also solves other problems that have caused trouble in previous reclaimers of the type in which the airstream carries the recovered mixture of solids into a cyclone chamber where these materials are separated from the airstream. Steel grit and other abrasives have worn the walls of the cyclones making eventual replacement necessary. In the present invention, the walls of the cyclone have a rubber coating that greatly reduces the wear and thus solves that problem.

In many cyclone separators the airstream leaves the cyclone through an outlet opening in the upper end of the cyclone, while the solid material settles onto a sloping floor. In separators of this type, some particles of grit and flake waste have heretofore tended to be carried out the air outlet before they could settle out of the airstream. In the present invention this problem is solved by surrounding the air outlet with a downturned flange that deflects the grit and by covering the air outlet with a screen that prevents passage of large lightweight particles. All these waste particles then settle onto the sloping floor.

In the present invention there is a perforated or screen-like basket beneath the outlet for the solid material at the lower end of the cyclone floor. The basket catches the large or oversize particles, while the rest of the recovered mixture passes through the screen and falls onto a slide. The basket is mounted in an inclined position, with its high end beneath the cyclone outlet. The oversize particles fall off its lower end into a funnel that conducts them directly into the outlet duct. Preferably, means are provided to vibrate the basket to shake the oversize particles off into the funnel while shaking the finer particles through the mesh and onto the slide.

The mixture of solids falls off the lower end of the slide in the path of the airstream, which comes out of its conduit at this point and passes through the solids into an outlet duct carrying the waste with it. The reclaimed abrasive particles fall down into a receptacle, where they are made available for reuse.

A further feature of this invention concerns improvements in connection with the outlet for solid materials at the lower end of the cyclone. This includes a rubber flapper valve that is opened wider by the weight of the solid material when that accumulates on the sloping floor and presses against it. The valve is regulated to provide a larger or smaller minimum opening. Two purposes of the flapper valve are to prevent air from passing out this lower outlet and to keep the abrasive from accumulating unduly in the cyclone. However, when the machine is started up empty, or is shut off, some air will pass through the flapper valve. In the past this air considerably disturbed the discrimination by blowing down the slide and striking the main airstream at the lower end of the slide, resulting in unwanted turbulence. Moreover, because the air was blowing in a circular path inside the cyclone, this undesirable outlet air current whipped out one side of the outlet carrying solids with it and blew them toward one side of the slide. When a narrow slide was used, the particles were blown over the side out of the path of the separating airstream.

The present invention has solved that problem by providing a construction that includes a sawtoothed lower edge on the flapper valve to distribute the air evenly and a series of parallel baffle plates just outside the lower cyclone opening. The notches in the valve and the baffle plates overcome the centrifugal effect and straighten out this undesirable airstream. The air is then directed through an opening into the main airstream conduit. A deflector plate located above this latter opening prevents the air from becoming diverted out of the main airstream conduit into the slide portion of the apparatus. At the same time this deflector plate and opening provides a venturi that draws the stray air into the main airstream. In other words, the disturbing current of air through the lower cyclone outlet is first straightened out and is then eliminated by diverting it back into the main airstream, and the solids fall down toward the slide free from any air currents.

The invention also includes an improved means for regulating the discrimination between fine particles and coarse particles, which will be explained in detail.

Other problems solved by the invention, as well as various objects and advantages, will appear from the following description. A preferred example is described in conformity with U. S. Revised Statutes, section 4888, but is not intended to limit the invention to the specific details enumerated, because the invention is clearly defined in the appended claims. The apparatus is herein described as an abrasive reclaimer, but it should be understood that the apparatus may also be used to separate or to reclaim other types of materials.

In the drawings:

Fig. 2 is a view in section taken along the line 2—2 in Figs. 1 and 3.

Fig. 3 is a plan view in section taken along the line 3—3 of Figs. 1 and 2.

Fig. 4 is a view in perspective of the screen basket, looking from above.

Fig. 5 is a view in perspective of a portion of the device adjacent the lower opening from the cyclone chamber, with portions broken away to show the baffles for diverting the unwanted air current passing through the lower cyclone opening into the main air conduit.

Fig. 6 is an enlarged view in perspective of the flapper valve for the lower cyclone outlet.

Fig. 7 is a view in perspective of the flange adjustment means above the rear end of the slide, by which the discrimination between fine and coarse particles may be varied. The walls to which the flange is attached are broken away to show the flange more clearly.

Figure 1:
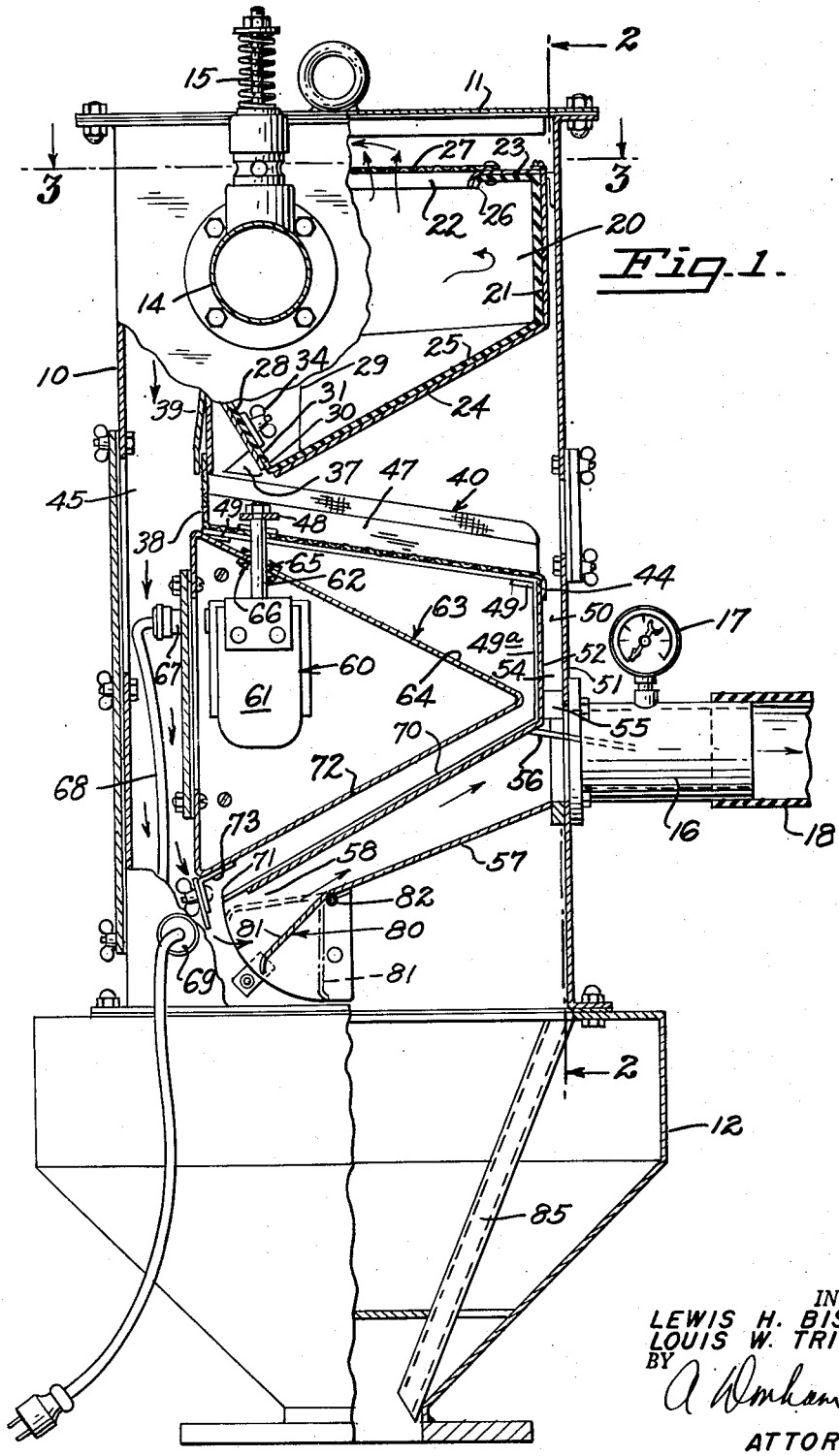
Fig. 1 is a view in elevation and partly in section of an apparatus embodying the principles of the invention. Two extreme positions of the outlet adjustment plate that adjusts the size of opening a the outlet mouth are shown in dotted lines.

The entire apparatus is best adapted to operate at low pressure and for that reason is all contained in an airtight housing 10. A pressure such as seven inches of mercury has been found satisfactory, but it may vary. The upper end of the housing 10 is closed by a removable lid 11, and the lower end of the housing 10 terminates in a hopper 12 that may rest on a feed hopper (not shown), being connected therewith by means of a dump valve (also not shown).

The airstream arrives from the work area (not shown) via the conduit 13, where it enters the housing 10 through the inlet fitting 14, which may be provided with a pressure relief valve 15. The airstream leaves the reclaimer housing 10 through the outlet fitting 16, which may have a vacuum gauge 17. When it leaves, it carries with it all the waste particles, both large and small, through a conduit 18 to a disposal unit (not shown). The valuable reclaimed abrasive falls down into the hopper 12.

Inside the housing 10 the solid particles are first separated from the airstream, then the larger waste particles are sepaarted from all the smaller particles, and finally the abrasive is reclaimed from the smaller waste particles.

The solid particles are separated from the airstream in a cyclone chamber 20 positioned inside the upper part of the housing 10. The solids-bearing airstream passes in through the inlet fitting 14 that extends through the walls of the housing 10 into the chamber 20. There, cylindrical side walls 21 cause the airstream to whirl around. At the same time, due to the fact that cross-sectional area of the cyclone is larger than that of the conduit 13, the airstream expands and loses velocity. This whirling and reduction in velocity causes the airstream to drop substantially all the solid material, and it then leaves the chamber 20 through an opening 22 in the chamber's upper end wall 23, while the solid particles fall on the sloping floor, 24. The airstream goes down a conduit 45 and is later used to separate the solid particles according to their specific gravity.

In order to prevent abrasive wear, the whole interior of the cyclone 20, including the side wall 21, the fitting 14, the upper wall 23, and the floor 24, are lined with a layer 25 of rubber, about ⅛" to ¼" thick. This lining 25 greatly increases the useful life of the cyclone chamber.

Preferably, the opening 22 is surrounded by a downturned lip 26 that deflects stray solid particles and helps prevent them from being carried out the opening 22 by the airstream. The opening 22 may also be covered by a screen 27 that keeps large stray particles from floating out.

The wall 28 opposite the floor 24 slopes sharply toward the floor, and the corners are curved in at 29 toward a central slit opening 30, which is preferably about half as wide as the cyclone 20. The opening 30 is preferably located directly beneath the inlet fitting 14 and lies transversely to it. In this way, the solid particles drop out of the chamber 20 in a path that lies perpendicular to their entrance path.

The opening 30 is normally closed by a gate or flapper valve 31, shown in detail in Fig. 6. Preferably, the gate or valve 31 comprises a sheet 32 of rubber or similar resilient material adjustably retained at its upper end on a base plate 33 by some such means as the wing nuts 34. The lower part of the rubber gate 31 is free to swing and it will be swung by the weight of the solid material which bears against it. When there is sufficient solid material against it, the gate 31 will be swung open enough to allow the solid material to fall out the opening 30. The lower edge of the rubber sheet 32 has a plurality of notches 35 that serve to distribute the outgoing material evenly and prevent it all from going out only at the outside edges, as was the case with earlier gates. The notches 35 mean that there is always an open outlet all the way across the gate 31. The upper end of the sheet 32 is provided with slots 36 so that the sheet 32 may be raised and lowered in order to vary the distance of its lower lip above the lower edge of the cyclone opening 30 to accommodate different types of treating operations.

The gate 31 will normally be closed except when there is sufficient solid material against it to force it open, and no air will pass through it during normal operation. However, when the reclaimer is empty, as the time before any solid material accumulates against the gate 31, some air may pass through the opening 30 and carry some solid material with it. This effect will stop as soon as enough solid material accumulates to block the opening 30, but in the meantime it would cause some trouble. The effect is worse because the air whirls around the chamber (clockwise in Fig. 3) and therefore tends to whip out the opening 30 in a tangential, crosswise path. Such an air current would carry the solids beyond the sides of the screen basket 40 and disrupt the reclaiming operation. To prevent this from happening, a plurality of baffles 37 are secured beneath the cyclone 20 adjacent the outlet 30. The drawings show four such baffles 37, each one of which is a small triangular metal member. (See Figs. 1, 2, and 5.) The baffles 37 straighten out the air current. The air that blows through the opening 30 is then deflected out through an opening 38 into the main airstream conduit 45, instead of blowing the solid material down the slide. The baffles 37 also prevent the air from blowing solid material out beyond the edges of the slide.

Another type of deflector member 39 is secured to the walls of the conduit 45 above the opening 38. The deflector may be a strip of metal that extends across the width of the housing 10, and its purpose is to prevent the main airstream from going through the opening 38. Without such a baffle, some of the air would tend to follow the path of the solid particles down the slide, but with the baffle 39 a venturi is formed that tends to suck air into the conduit 45. Thus, there are no air currents in the path which the solid particles follow after they fall out through the opening 30.

A basket 40 is positioned directly below the opening 30. The basket 40 (see Fig. 4) may be made from wire cloth, such as sieve material, or it may be perforated in some other manner so that it will retain the large flakes of material, but will permit fine material, such as both the abrasive and the fine waste, to fall through the openings onto the slide 64. For example, for #G25 steel abrasive, a 10 mesh, 19 gauge screen may be used. For #G50 steel abrasive, a 14 mesh, 20 gauge screen may be used.

A preferred shape for the basket 40 is shown in Fig. 4. The side walls 41 and one end wall 42 are substantially vertical, while the opposite end 43 is open, and has a short depending lip 44. The end wall 42 is higher than this side wall 41 so that it can fit up into the space between the baffles 37 and the deflector 39 (see Figs. 1 and 5). The screen basket 40 may measure about 10" by 10½" by 2¼", measuring the height at the side walls 41, and it may be made from a single piece of wire cloth, cut, bent to shape, and brazed together at the corners.

When a vibrator such as the vibrator 60 is used, a vibrator support frame 46 is preferably secured to the basket 40. This may include two flat bars 47 brazed to the lower part of the basket side walls 41 and a cross bar 48 extending between the side bars 47. The bar 48 is preferably positioned so that its upper surface is substantially horizontal when the basket 40 is installed.

Preferably the basket 40 is retained in a gently sloping position with its high end 42 just beyond and beneath the gate opening 30. It may rest on four rubber bumpers 49, two of which are secured to the dust-proof compartment 63 (discussed below) and the other two of which are secured on the upper end of a vertical partition 49a that extends across the housing 10.

Material may fall off the lip 44 at the low end 43 of the basket 40 into a funnel or conduit 50 that is located just beyond the partition 49a and that conducts them into the outlet fitting. The funnel 50 may be bounded on one side by the end wall 51 of the housing 10, and it may include a tapered vertical end wall 52 that is secured to the partition 49a and two sloping walls 53 and 54 that converge toward an opening 55 in the fitting 16 (see Figs. 1, 2, and 3).

Preferably, there is a baffle plate 56 beneath the opening 55. The baffle 56 slopes toward the outside of the housing 10, and extends well down into the fitting 16. The baffle 56 deflects the falling flakes so that they do not tend to slide down the sloping outlet duct 57 toward its mouth 58.

A vibrator 60 may be employed to shake the basket 40 so that all the fine materials will be sure to pass through the sieve openings and so that the oversize materials will be jogged off into the funnel 50. As shown in Fig. 1, the vibrator 60 may be electrical. It may include a vibrating motor 61 whose elongated shaft 62 is suspended from the support frame 46, through an opening in the bar 48. The passage of the shaft 62 through the basket 40 is preferably grommeted, but there need be no other support for the vibrator 60. Since the basket 40 is not secured to any fixed walls but rests loosely on the four bumpers 49, its vibrations will shake the whole basket. The rigid frame 46, being brazed to the side walls of the basket 40, helps transmit these vibrations to all parts of the basket and prevents dampening of the vibrations by the resiliency of the basket proper.

Preferably, the motor 61 is protected from the abrasive and dust by enclosing it in a dust-tight compartment 63, whose sloping upper surface 64 comprises that portion of the slide means directly beneath the basket 40. The motor's shaft 62 extends through an opening 65, and the dust is sealed out by a grommet 66. The vibrator motor 61 may be connected to a socket 67 that extends through the wall of the compartment 63. A power supply cord 68 may extend down the conduit 35 from the other side of the socket 67 to another socket 69 that extends through the housing walls and to which the power may be supplied from an external source. As the motor 61 vibrates, the shaft 62 transmits these vibrations to the basket 40.

The fine particles of abrasive and waste fall down the upper outer surface 62 of the compartment 63 and fall off its lower end onto another slide 70. The slide 70 may adjoin the top wall of the outlet duct 57. In any event, the mouth 58 of the outlet duct 57 preferably lies directly beneath the end 71 of the lower half of the slide 70. Preferably, the mouth 58 of the outlet duct 57 extends the full width of the housing 10, while the duct 57 gets narrower as it goes up toward the outlet fitting 16. The lower wall 72 of the compartment 63 may lie over and be approximately parallel to the slide 70, with a slight divergence toward the lower end.

At the lower end of the wall 72, adjacent the lower end of the conduit 45 and the lower end of the slide 70, there may be an adjustable flange 73 by which the discrimination between the solid particles may be adjusted. (See Fig. 6.) Preferably this comprises an angle bracket 74 secured to the lower wall 72 so as to overlie the lower end of the slide 70, and a flat partition member 75, which is vertically adjustable thereon by means of the bolts 76 and wing nuts 77 passing through its slots 78. Lowering the partition 75 will cause the solid particles to fall closer to the mouth 58, and raising the partition will cause them to fall further away from the mouth 58.

There may also be an adjustable lip 80 pivotally mounted on the lower wall of the outlet duct 57 so that the cross-sectional area of the mouth 58 may be varied. This will vary the velocity of the airstream, and so this lip 80 also enables adjustment of discrimination. The lip 80 may comprise a hinged plate 81 and there may be a handle (not shown) outside the housing 10 for rotating the plate 81 about its hinge 82.

After the airstream passes around the lower end of the adjustable flange 73, it passes through the falling material and into the outlet duct 57. The lightweight waste is carried by it into the outlet duct 57 and from there by the conduit 18 to a waste collector (not shown). The heavier abrasive falls down into the hopper 12, and from there may be passed intermittently into a grit feed chamber. A tube 85 may extend the full height of the hopper 12, so as to equalize the pressure and let the material fall through when the valve opens.

In operation, the airstream carrying a mixture of dust, grit, and flakes of waste, enters the cyclone chamber 20, through the inlet fitting 14. As the airstream whirls and expands into the chamber 20, the dust falls out and slides down the floor 24 and against the gate 31, while the air passes out through an upper outlet opening 22. The rubber lining 25 reduces the wear on the walls and other parts of the cyclone chamber 20. The downturned lip 26 around the opening 22 and the screen 27 prevent solid particles from passing out the upper opening 22. The notches 35 in the gate 31 and the swinging action of the rubber sheet 32 permit the mixture to fall out through the lower outlet opening 30 into the basket 40. The notches 35, baffle members 37, and opening 30 help to channel any stray air that passes through the opening 30 into the main air conduit 45, the deflector 39 aiding in this by causing a Venturi action that sucks air out through the opening 38. As the solid material slides along the sloping basket 40, the basket is vibrated by the vibrator 60. The fine waste or dust and the grit fall through the basket onto the slide 64, 70, while the oversize waste particles fall off the open end 43 of the basket 40 into the funnel 50 and from there by way of the baffle 56 into the outlet fitting 16.

The grit and dust fall down the slide 64, 70 and off the end of the slide 70 in front of the mouth 58 of the outlet duct 57. The airstream which has passed out from the cyclone 20 through the upper outlet opening 22 flows down the conduit 45 and then passes through the falling mixture. The airstream carries the fine waste and the dust into the outlet conduit and later picks up the oversize waste just past the baffle 56 and carries all the waste away, while the reclaimed grit falls down into the reclaimer hopper. The discrimination of the airstream may be adjusted by varying the velocity of the airstream which is done by varying the lip 80 or by varying the angle of fall which is done by adjustment of the flange 73.

The early separation of the oversize waste from the rest of the mixture enables accurate reclamation of the re-useable treating materials and also obviates any stoppages of the reclaimer in order to clean the screens. All of the waste solids may then be carried continuously away in one airstream to a remote disposal unit. The result is that the reclaimed material is ready for immediate reuse over and over as it passes through the cycle, and the treating machine may be operated continuously for long periods of time with a relatively small amount of treating material.

What is claimed is:

1. A reclaimer for separating waste material and the like from abrasive and the like, including in combination: walls defining a cyclone chamber having an inlet opening through its side wall where a mixture of materials may be introduced in an airstream, the solid materials falling out of said airstream in said chamber, said chamber having an outlet opening for said airstream in its upper end, and a floor sloping toward a bottom opening for solid materials; a perforated basket positioned on a slope with its high end beneath said bottom-opening; a slide means beneath said basket to receive the sifted particles falling therethrough; an outlet duct with its inlet opening beneath the lower end of said slide means; a conduit for conducting the airstream from the upper outlet opening of said cyclone chamber to a locus opposite the opening of said duct, where it may pass through the sifted particles falling from said slide, carrying the waste with it into the outlet duct while the abrasive falls below; and a second conduit for conducting the large waste particles that fall off from the low end of said basket into said outlet duct at a point beyond its said opening.

2. The reclaimer of claim 1 in which the basket comprises an open-topped wire cloth container with its lower end open so that the large waste particles will fall directly into said second conduit.

3. The reclaimer of claim 1 in which there is means to vibrate said basket so as to achieve better sifting and to shake the large particles off the low end.

4. The reclaimer of claim 3 in which the vibrating means include an electric vibrator suspended from said basket by its reciprocating shaft, with its motor sealed in a dust-proof chamber below said basket, said shaft being encircled by a dust-sealing means where it extends out through the walls of said dust-proof chamber.

5. The reclaimer of claim 3 in which there is a rigid frame member rigidly secured to the side walls of said basket, said vibrator means being suspended therefrom, whereby the vibrations are transmitted substantially undampened to all parts of said basket.

6. The reclaimer of claim 1 in which the upper outlet opening from said cyclone chamber is encompassed by a downturned curved flange so that solid particles striking it will be diverted downwardly and thereby prevented from passing out with said airstream.

7. The reclaimer of claim 1 in which the upper outlet is covered with a screen means to prevent the passage therethrough of large solid particles.

8. The reclaimer of claim 1 in which the entire inner surface of the cyclone chamber is rubber lined.

9. The reclaimer of claim 1 in which there are a plurality of parallel baffle means adjacent the lower outlet from said cyclone, extending out from the wall of said cyclone to divert any air passing through said opening into said airstream conduit while the solid particles fall into said basket.

10. The reclaimer of claim 1 in which there are: a gate in said cyclone bottom opening, said gate comprising a flexible flapper valve having a serrated lower edge; and a plurality of parallel baffle means outside said cyclone adjacent said gate, extending out from the wall of said cyclone to divert any air passing through said cyclone bottom opening through an opening into said airstream conduit while the solid particles fall into said basket.

11. The reclaimer of claim 10 in which there is a deflector in said airstream conduit above the opening into said conduit, said deflector substantially narrowing said conduit so as to produce a Venturi action at that point that draws air into said conduit through said conduit opening.

12. The reclaimer of claim 1 in which there is a depending flange opposite the low edge of said slide means, the length of said flange being vertically adjustable to regulate the angle of fall of the solid particles from the airstream.

13. The reclaimer of claim 1 in which there is a baffle in said duct beneath said second conduit to divert falling particles away from said inlet opening.

14. In a device for separating two or more solid materials, said device having a cyclone separator with an inlet for an airstream conveying a mixture of solid materials, an airstream outlet, and an outlet for solid materials, a slide beneath said last named outlet, an outlet duct with its inlet opening directly beneath the lower end of said slide, and a conduit for conveying the airstream from said airstream outlet to a locus adjacent said duct opening; the combination therewith of a screen basket positioned in a sloping position between the cyclone outlet for solid materials and said slide, the lower end of said basket being open; a vertical conduit leading from the open end of the basket into said outlet duct, whereby solid material falling off the open end of said basket will fall directly into said outlet duct; and a baffle at the juncture of said outlet duct and said vertical conduit for breaking the fall of said solid material.

15. In a device for separating two or more solid materials, said device having a cyclone separator with an inlet for an airstream conveying a mixture of solid materials, an airstream outlet, and an outlet for solid materials, a slide beneath said last named outlet, an outlet duct with its inlet opening directly beneath the lower end of said slide, and a conduit for conveying the airstream from said airstream outlet to a locus adjacent said duct opening; the combination therewith of a screen basket positioned on a slope between said cyclone outlet for solid materials and said slide, the high end of said basket being beneath said outlet and the low end of said basket being open; a vibrating means connected with said basket; and a second conduit leading from the low open end of the basket into said outlet duct, to conduct the particles too large to pass through said basket as said large particles are shaken off the low end of said basket.

16. The device of claim 15 in which said vibrating means is connected to said basket by means of a rigid frame having members extending along the side walls of said basket and rigidly secured thereto.

17. The device of claim 15 in which there is a baffle in said outlet duct beneath said second conduit to divert falling particles away from said outlet duct opening on to a flat portion of said duct.

18. In a device for separating two or more solid materials said device having a cyclone separator with an inlet for an airstream conveying a mixture of solid materials, an airstream outlet, and an outlet for solid materials, a slide beneath said last named outlet, an outlet duct with its inlet opening directly beneath the lower end of said slide, and a conduit for conveying the airstream from said airstream outlet to a locus adjacent said duct opening; the combination therewith of a depending flange between the lower end of said conduit and the lower end of said slide, said flange being adjustable vertically to affect the angle at which solid particles fall off said slide to bring them nearer to said outlet duct or further therefrom and thereby effect adjustment of the point of discrimination at which particles are separated.

19. The device of claim 5 in which said rigid frame member lies directly beneath the bottom opening of said cyclone chamber, so that the fall of the mixture of solid materials is broken by said frame member and the life of said basket is prolonged.

20. The device of claim 16 in which said rigid frame lies beneath said cyclone outlet in the path of the solid materials falling therefrom, so that the velocity of the fall is broken and the life of the basket is prolonged.

LEWIS H. BISHOP.
LOUIS W. TRIBBETT.

References Cited in the file of this patent

UNITED STATES PATENTS

| Number | Name | Date |
|---|---|---|
| 765,836 | Hettinger | July 26, 1904 |
| 996,155 | Spenst | June 27, 1911 |
| 1,226,652 | Miller | May 15, 1917 |
| 1,229,542 | McKenna | June 12, 1917 |
| 1,373,685 | Torrence | Apr. 5, 1921 |
| 1,685,940 | Deister | Oct. 2, 1928 |
| 1,737,260 | Mjolsness | Nov. 26, 1929 |
| 1,781,352 | Tolman | Nov. 11, 1930 |
| 1,811,597 | Steinbart | June 23, 1931 |
| 1,882,908 | Reynolds | Oct. 18, 1932 |
| 2,114,727 | Thys | Apr. 19, 1938 |
| 2,523,614 | Elverum | Sept. 26, 1950 |

FOREIGN PATENTS

| Number | Country | Date |
|---|---|---|
| 350,603 | Germany | Nov. 25, 1920 |
| 44,489 | France | Nov. 8, 1934 |